June 15, 1965  R. W. KEAHEY  3,189,348
TIMER FOR DISCONNECTING MECHANISM FOR AUTOMATIC PIN SETTERS
Filed Jan. 29, 1962  2 Sheets-Sheet 1

INVENTOR.
Richard W. Keahey
BY
Townsend and Townsend
Attorneys

June 15, 1965  R. W. KEAHEY  3,189,348
TIMER FOR DISCONNECTING MECHANISM FOR AUTOMATIC PIN SETTERS
Filed Jan. 29, 1962  2 Sheets-Sheet 2

INVENTOR.
Richard W. Keahey
BY
Townsend and Townsend
attorneys

United States Patent Office 3,189,348
Patented June 15, 1965

3,189,348
TIMER FOR DISCONNECTING MECHANISM FOR AUTOMATIC PIN SETTERS
Richard W. Keahey, 405 Komsthoeft Ave., Campbell, Calif.
Filed Jan. 29, 1962, Ser. No. 169,346
6 Claims. (Cl. 273—43)

This invention relates to a new and improved timer for deactuating a portion of the mechanism of the automatic pin setters of the type conventionally employed in bowling alleys.

One of the problems encountered in maintenance of automatic pin setting machines arises from the fact that, whereas in normal operation of a bowling alley lane, the pin setting machine is turned on at the commencement of a game and is continuously energized until conclusion of play. Nevertheless, it sometimes occurs that the patron stops bowling for an extended period of time prior to the conclusion of the game. If the machine continues to operate continuously, as is the present practice, this results in wear of gears, clutches, pulleys and belts. The primary purpose of the present invention is to reduce maintenance costs by extending the life of the aforementioned parts and the necessary labor in repairing and installing same.

In essence, the present invention provides means whereby if an extended period of time lapses between two successive bowling balls reaching the pit at the end of the lane, a clutch is disengaged until the next ball is rolled. Disengagement of the clutch stops running of the portions of the machine most likely to be damaged by excessive wear.

A feature and advantage of the invention is the fact that the timer is actuated by linkage controlled by the balls themselves and does not require any manual actuation. Further, the mechanism, hereinafter explained in detail, is attached to pre-existing parts of the machine so that a minimum of alteration of the existing machine is required in order to adapt the machine to the present invention.

A still further feature of the machine is the fact that the number of its moving parts is minimal and, for the most part, are standard devices readily obtained on the market.

Still another advantage of the invention is the fact that means may be provided to adjust the automatic timer so that the time interval which must elapse before the clutch disengages may be varied, depending upon the preference of the operator of the lane.

Other objects of the present invention will become apparent upon reading the following specification and referring to the accompanying drawings in which similar characters of reference represent corresponding parts in each of the several views.

Figure 2:
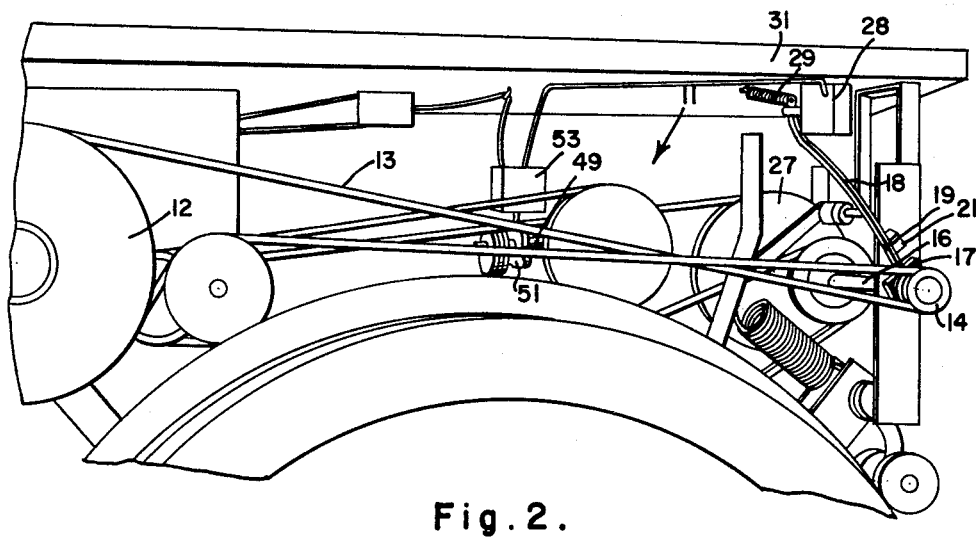
FIG. 2 is a fragmentary rear elevational view of the portion of the pin setter mechanism with the present invention installed thereon.

In FIG. 2 is shown a portion of the bowling pin setter or moving mechanism 11 with the present invention installed therein. A motor (not shown) turns shaft 16 upon which sheave or pulley 14 is mounted so as to drive sheave 12 via belt 13. In the prior art pulley 14 is affixed to shaft 16 so that as long as shaft 16 is rotating sheave 14 turns. The present invention provides means for disengaging shaft 16 from driving relationship with sheave 14.

For such purpose, pulley 14 is mounted loosely upon shaft 16 and is in juxtaposition with clutch 17 which slides in an axial direction on shaft 16. When clutch 17 is moved into proximity with pulley 14 torque is converted from shaft 16 to the pulley. However, when clutch 17 is moved away from pulley 14 the two parts are disengaged and there is no torque conversion from shaft 16 to the pulley. A convenient means for moving clutch 17 comprises an S-shaped lever 18, pivoted by means of pin 19 to bracket 21 on a stationary portion of the machine. Lever 18 at its lower end is pinned to collar 22 which fits into an annular groove 23 in the exterior of clutch 17. The upper end of lever 18 is fixed by means of adjustable bracket 26 to the armature 27 of solenoid 28 which is attached to a permanent portion 31 of the machine. Spring 29 is fixed at one end to stationary member 31 and at the other end to the end of lever 18 and hence biases clutch 17 into engagement with pulley 14.

Accordingly, when solenoid 28 is energized, clutch 17 is disengaged and when it is de-energized clutch 17 is engaged.

Figure 1:
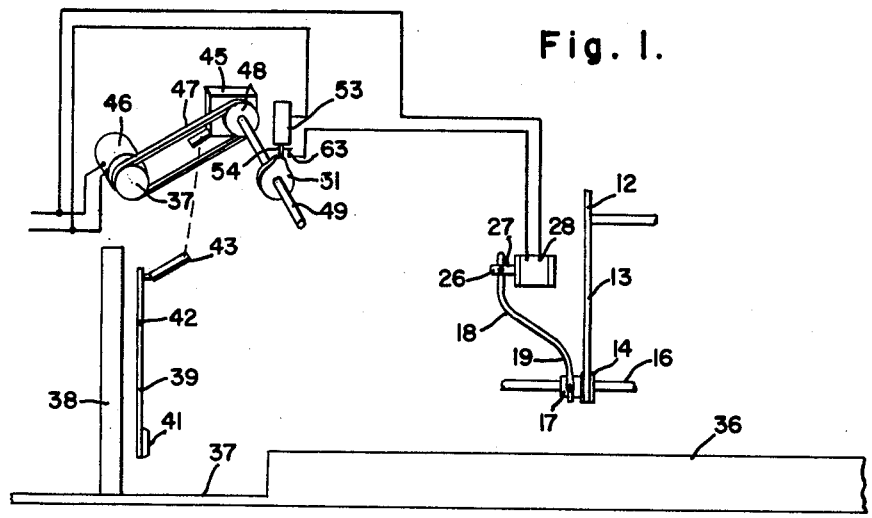
FIG. 1 is a schematic view showing mechanical portions of the invention and associated electrical elements and wiring therefor.

Directing attention to FIG. 1, there is shown the end of lane 36 and pit 37 at the extreme end thereof. A backstop 38 is positioned at the back of pit 37. Immediately in front of backstop 38 is curtain 39 having bumper 41 at the lower end thereof which is engaged by a bowling ball traveling the length of lane 36 and falling into pit 37. Curtain 39 is pivoted by means of transverse rod 42 to a stationary structure. The upper end of curtain 39 is in proximity to lever arm 43 which is so located that each time a ball engages a bumper 41, arm 43 operates a clutch 45. The clutch 45 is arranged to engage pulley 48 with shaft 49 so that the shaft 49 will go through its operative cycle. The clutch 45 contains a conventional clutch mechanism which allows the torque conversion from motor 46 from pulley 37 to pulley 48 via belt 47 in such a way that the pulley 48 is engaged for predetermined intervals in order to create the proper sequencing for the bowling machine. This device is conventional in bowling machines and constitutes no part of the instant invention.

Shaft 49 is a standard part of the pin setting or positioning mechanism and in the conventional structure carries a cam 51 which performs a useful function in controlling the movement of a deck hook cam lever 52 to perform functions which are well understood in this art.

Figure 3:
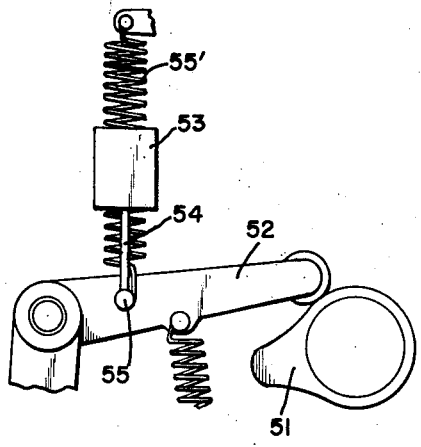
FIG. 3 is a partially schematic fragmentary side elevational view of a structure similar to that shown in FIG. 2 but showing the provision of a lever arm which may be used to couple the dash pot to the cam of the pin setter mechanism.
Figure 5:
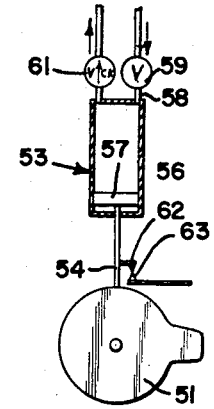
FIG. 5 is a schematic view of the dash pot assembly.
Figure 4:
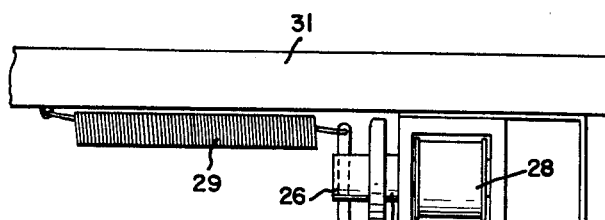
FIG. 4 is an enlarged side view of a portion of the mechanism of FIG. 2.
Figure 4:
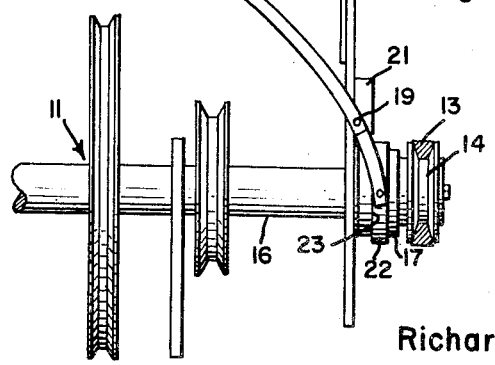

In accordance with the present invention as distinguished from conventional practice there is installed a dash pot timer 53 having its piston rod 54 located to be actuated by arm 52 as shown in FIG. 3. In actual practice the piston rod 54 is in contact with a pin 55 which is additionally used to carry the upward biasing spring 55'. Each time cam 51 rotates it will cause the arm 52 to reciprocate. The reciprocation of arm 52 causes the resetting of shaft or rod 54. Shaft arm 52 provides a convenient mechanism for coupling the action of the arm to the shaft or rod 54. The rod, however, can be directly engaged with cam 51, as suggested in FIGS. 1, 2 and 5, if desired.

The timer 53 comprises a cylinder 56 in which piston 57 reciprocates, piston 57 having its rod 54 depending through the lower end thereof and terminating in proximity to the path of cam 51. An air inlet port 58 is located at the top of cylinder 56 and this port is controlled by an adjustable valve 59 so that by opening or closing valve 59 the time required for piston 57 to travel from the upper end of cylinder 59 to the lower end may be shortened or lengthened. A check valve 61 permits free upward movement of piston 57, but closes when the piston begins its downward stroke. A switch contact 62 rides with rod 54 and at the lower end of the stroke of piston 57 engages stationary contact 63. When the contacts 62-63 are in engagement solenoid 28 is energized, as is clear from viewing diagram FIGS. 1 and 5.

Hence in operation, each time that a ball is received in pit 37 lever 43 is arranged to actuate clutch 45 so that the timing circuit within the clutch will cause the shaft 49 to go through its appropriate cycle which in turn raises piston 37 to the upper end of its stroke.

Piston 57 immediately begins its downward movement which can be timed to an interval of, say, between two and four minutes, depending upon the wishes of the operator of the lane, by adjusting valve 59. If a patron delays bowling the next ball for greater than its predetermined time interval, piston 57 completes the downward movement closing contacts 63-63, thereby energizing solenoid 28 and disengaging clutch 17 which stops rotation of the principal portions of the mechanism of the pin setting machine. However, if a normal time is consumed between balls, then piston 57 does not have sufficient time to complete its downward stroke and the contacts 62-63 do not engage.

By disengaging pulley 14 from shaft 16 which operates many of the less durable portions of the equipment, considerable saving is achieved in replacement parts and labor.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In combination, a shaft operable to operate a bowling pin moving mechanism of an automatic pin setting device, a clutch on said shaft, drive means operable to turn said shaft when said clutch is in engaged position and to disengage said shaft when said clutch is in disengaged position, a solenoid controlling movement of said clutch between engaged and disengaged positions, pin positioning means operable to go through one cycle of operation when energized, a curtain positioned to be moved by a bowling ball reaching the pit of a lane, means operated by movement of said curtain by impact of a bowling ball thereon to energize said pin positioning means, a cam mounted on said pin positioning means to rotate at least through one revolution during each cycle of operation of said pin positioning means, a dash pot having a piston arranged to be lifted upon turning of said cam, switch means having a first contact movable with said piston and a stationary second contact positioned to be contacted by said first contact after said piston has dropped a predetermined distance from the raised position corresponding to elapse of a time interval, and an electric circuit including said switch means and said solenoid arranged to energize said solenoid when said first and second contacts are closed, said solenoid operable to disengage said clutch when energized, whereby lapse of more than a predetermined time interval between successive bowling balls moving said curtain disconnects said shaft from said pin moving mechanism.

2. The combination of claim 1 in which further comprises a bleeder valve in said dash-pot to adjust the rate of dropping movement of said piston.

3. In combination, drive means, driven means, a clutch movable between engaged position driving said driven means from said drive means and disengaged position, a bowling lane having ball-actuated means moved by a ball reaching the end of said lane, a dash-pot having a piston, means to raise said piston to raised position upon every movement of said ball-actuated means, switch means having a first contact movable with said piston and a stationary second contact positioned to close with said first contact after said piston has dropped a predetermined distance from raised position corresponding to elapse of a time interval after raising of said piston, and solenoid means connected to said switch means operable to move said clutch to the disengaged position upon closing of said switch means.

4. In combination, drive means, driven means, a clutch movable between engaged position driving said driven means from said drive means and disengaged position, a bowling lane having ball-actuated means moved by a ball reaching the end of said lane, a timer, means to start said timer upon every movement of said ball-actuated means, a switch having a movable first contact controlled by said timer and a stationary second contact positioned to establish electrical contact with said first contact after lapse of a predetermined time interval after start of said timer, a solenoid connected to move said clutch to disengaged position when energized, and an electrical circuit including said solenoid and switch operable to energize said solenoid when said first and second contacts are in the closed position.

5. The combination of claim 4 which further comprises adjustment means for said timer.

6. A device for use with an automatic pin setting means in a bowling lane of the type having a first section operable to go through one cycle of operation upon actuation and a second section normally in continuous operation comprising, in combination: a drive source, a shaft, said second section of said pin setting means driven by said shaft, a clutch operable in engaged position to connect said shaft with said drive source and in disengaged position to disconnect said shaft from said drive source, pressure responsive starting means operably connected to said first section actuable upon absorbing the impact of a bowling ball to energize said first section and set in motion said first section for one cycle of operation, timer shut off means, means operably connected to said pressure responsive means to cause said timer shut off means to be deactuated each time the pressure responsive means is actuated, said timer shut off means operably connected to said clutch to cause said clutch to disengage when said timer shut off means is actuated and stop operation of the second section of said pin setting means, and said timer shut off means including delay means to cause said timer shut off means to be actuated only upon the lapse of a preselected time interval between deactuations caused by actuations of said pressure responsive means.

References Cited by the Examiner
UNITED STATES PATENTS

| | | | |
|---|---|---|---|
| 1,985,563 | 12/34 | Fitzgerald | 317—130 |
| 2,967,708 | 1/61 | Huck et al. | 273—43 |

DELBERT B. LOWE, *Primary Examiner.*

EVON C. BLUNK, *Examiner.*